US012305713B2

(12) United States Patent
Yoda et al.

(10) Patent No.: US 12,305,713 B2
(45) Date of Patent: May 20, 2025

(54) SENSOR MODULE

(71) Applicant: SHINKO ELECTRIC INDUSTRIES CO., LTD., Nagano (JP)

(72) Inventors: Atsuto Yoda, Nagano (JP); Takumi Ikeda, Nagano (JP)

(73) Assignee: SHINKO ELECTRIC INDUSTRIES CO., LTD., Nagano (JP)

(*) Notice: Subject to any disclaimer, the term of this patent is extended or adjusted under 35 U.S.C. 154(b) by 255 days.

(21) Appl. No.: 17/814,630

(22) Filed: Jul. 25, 2022

(65) Prior Publication Data

US 2023/0037144 A1  Feb. 2, 2023

(30) Foreign Application Priority Data

Jul. 30, 2021 (JP) ................. 2021-126001

(51) Int. Cl.
  *F16C 41/00* (2006.01)
  *F16C 17/24* (2006.01)
  *G01M 13/04* (2019.01)
  *G08C 17/02* (2006.01)
(52) U.S. Cl.
  CPC ............ *F16C 41/008* (2013.01); *F16C 17/24* (2013.01); *G01M 13/04* (2013.01); *G08C 17/02* (2013.01); *F16C 2233/00* (2013.01)
(58) Field of Classification Search
  CPC .. F16C 33/6651; F16C 33/6614; F16C 17/24; F16C 19/06; F16C 19/522; F16C 19/525; F16C 19/527; F16C 2233/00; F16C 2300/02; F16C 35/077; F16C 41/007; F16C 41/008; G01M 13/04; G08C 17/02

USPC ............ 73/781, 862.192, 488, 511, 514.01, 73/514.02

See application file for complete search history.

(56) References Cited

U.S. PATENT DOCUMENTS

| | | | |
|---|---|---|---|
| 2005/0134460 A1* | 6/2005 | Usami | H01Q 23/00 343/700 MS |
| 2006/0049995 A1* | 3/2006 | Imaoka | H01Q 1/2283 343/702 |
| 2006/0170551 A1* | 8/2006 | Nakamura | F16C 41/008 340/572.1 |
| 2021/0098858 A1* | 4/2021 | Destraves | B60C 23/0493 |
| 2022/0021438 A1* | 1/2022 | Manabe | H01Q 13/10 |
| 2023/0123983 A1* | 4/2023 | Carrier | H01L 23/573 257/784 |

FOREIGN PATENT DOCUMENTS

| | | | | |
|---|---|---|---|---|
| EP | 1203960 A2 * | 5/2002 | | F16C 19/525 |
| JP | 2003097582 A * | 4/2003 | | F16C 19/525 |
| JP | 2005-042895 | 2/2005 | | |
| WO | WO-2020209206 A1 * | 10/2020 | | H04B 7/145 |

* cited by examiner

*Primary Examiner* — John E Breene
*Assistant Examiner* — Truong D Phan
(74) *Attorney, Agent, or Firm* — IPUSA, PLLC

(57) ABSTRACT

A sensor module includes a metal member having a side surface extending in a ring shape, and a recess recessed from the side surface and extending in a ring shape along the side surface, a resin part filling an inside of the recess, a radiating part provided in the resin part and configured to emit radio waves, a radio communication device provided in the resin part and electrically connected to the radiating part, and a sensor electrically connected to the radio communication device. The metal member is insulated from the radiating part by the resin part, and functions as a passive element.

15 Claims, 13 Drawing Sheets

SENSOR MODULE

CROSS-REFERENCE TO RELATED APPLICATIONS

This application is based upon and claims priority to Japanese Patent Application No. 2021-126001, filed on Jul. 30, 2021, the entire contents of which are incorporated herein by reference.

FIELD

Certain aspects of the embodiments discussed herein are related to sensor modules.

BACKGROUND

A conventionally known rolling bearing unit (or antifriction bearing unit) includes an inner ring, an outer ring, a plurality of rolling elements arranged between the inner ring and the outer ring and rotatable relative thereto, a sealing device having a ring shape, and a radio frequency (RF) tag. A base end of the sealing device is fixed to one of the inner and outer rings, and a tip end of the sealing device is arranged within a seal groove formed in the other of the inner and outer rings. The RF tag is disposed on at least an outer surface of the sealing device.

There are proposals to monitor temperature information, vibration information, or the like by providing a temperature sensor, a vibration sensor, or the like in the RF tag, and to supply a rotation signal generated by a velocity sensor to a control circuit through a lead wire or the like. However, there are no specific proposals on how such detection data can actually be obtained outside the bearing apparatus.

As proposed in Japanese Laid-Open Patent Publication No. 2005-042895, for example, the RF tag is disposed at a position separated from a metal member, in order to provide an excellent communication state for the RF tag. Further, when providing the velocity sensor, the RF tag and the velocity sensor are attached to an end cap made of a resin.

Hence, the conventional bearing device disposes the RF tag at the position separated from the metal member, in order to provide the excellent communication state for the RF tag, and does not use a metal member for the communication.

SUMMARY

Accordingly, it is an object in one aspect of the embodiments to provide a sensor module that can utilize a metal member as a radiating element.

According to one aspect of the embodiments, a sensor module includes a metal member having a side surface extending in a ring shape, and a recess recessed from the side surface and extending in a ring shape along the side surface; a resin part filling an inside of the recess; a radiating part provided in the resin part and configured to emit radio waves; a radio communication device provided in the resin part and electrically connected to the radiating part; and a sensor electrically connected to the radio communication device, wherein the metal member is insulated from the radiating part by the resin part, and functions as a passive element.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
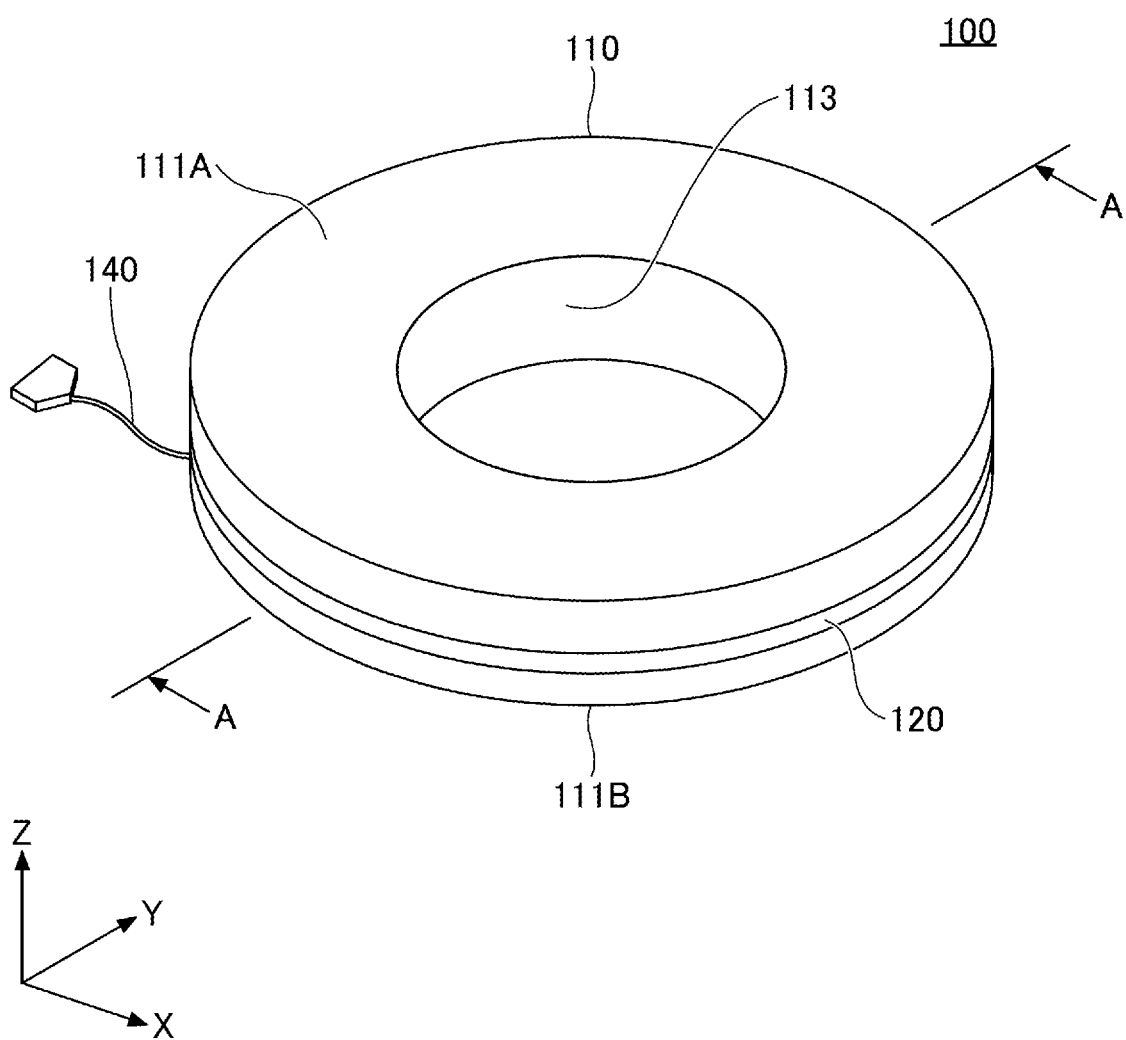
FIG. 1 is a perspective view illustrating a sensor module 100 according to an embodiment.

Preferred embodiments of the present invention will be described with reference to the accompanying drawings. In the drawings, those parts that are the same are designated by the same reference numerals, and a repeated description of the same parts may be omitted.

<Embodiment>

Figure 2:
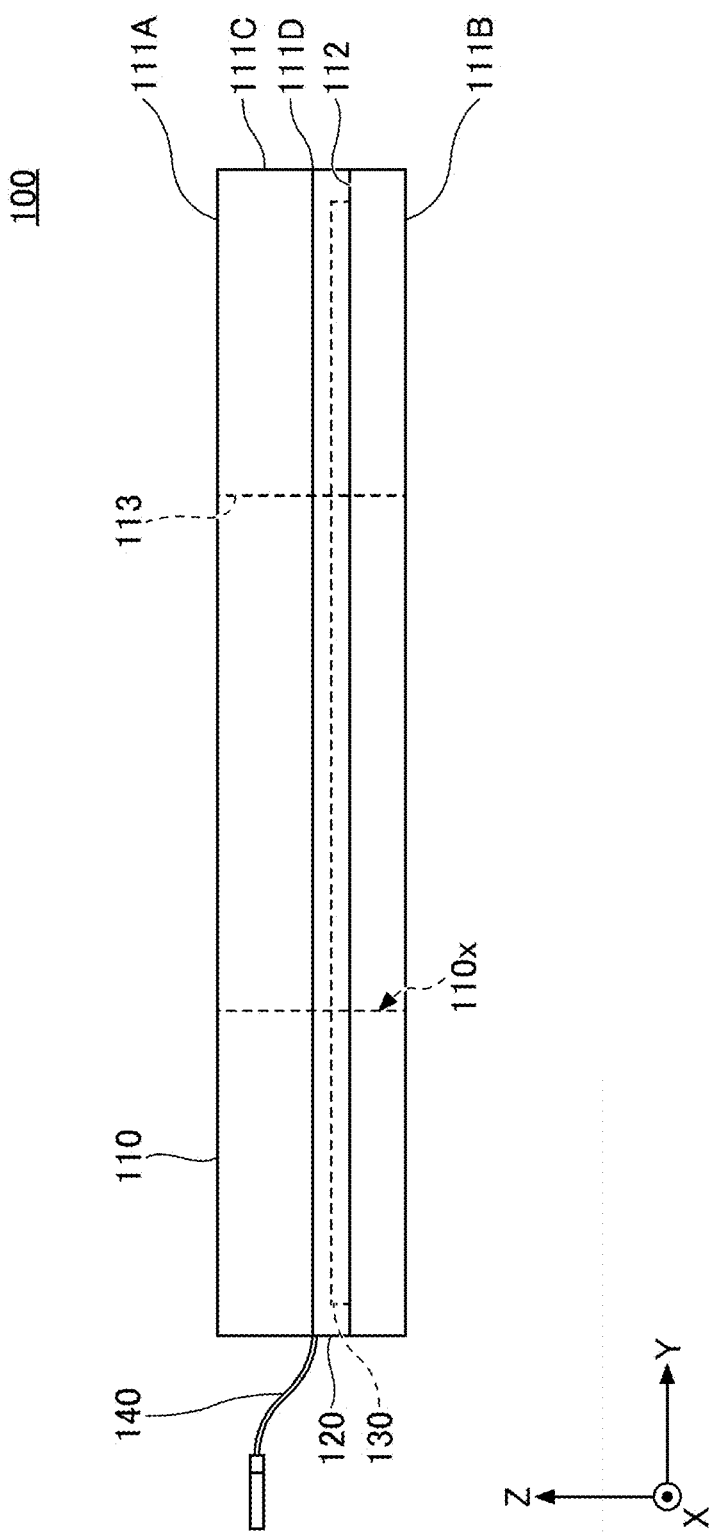
FIG. 2 is a side view illustrating the sensor module 100 according to the embodiment.
Figure 3:
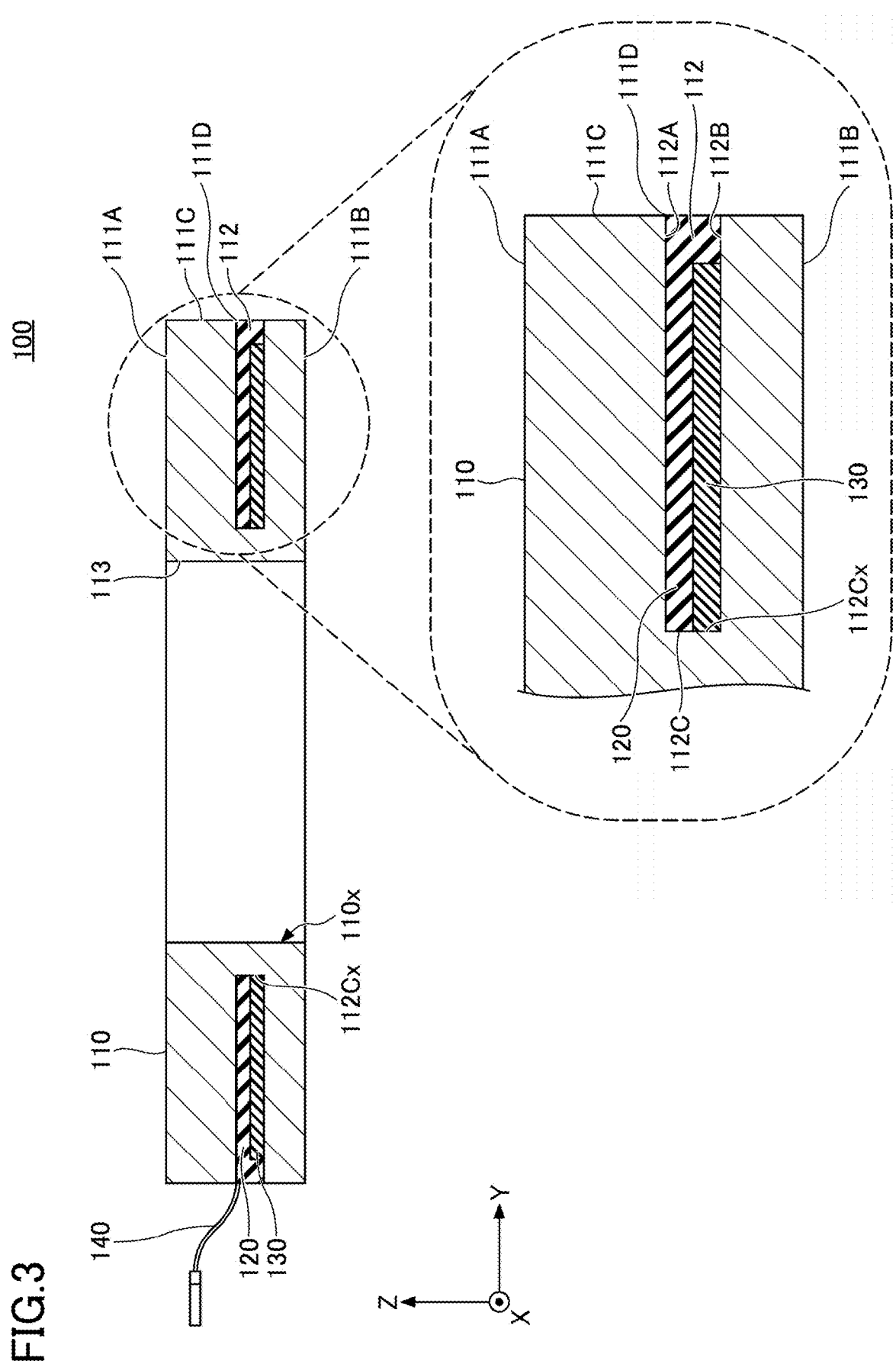
FIG. 3 is a diagram illustrating a cross sectional view along a line A-A in FIG. 1.

FIG. 1 is a perspective view illustrating the sensor module 100 according to an embodiment. FIG. 2 is a side view illustrating the sensor module 100 according to the embodiment. FIG. 3 is a diagram illustrating a cross sectional view along a line A-A in FIG. 1. In the following, an XYZ coordinate system is defined and described, and a view of an XY-plane will be referred to as a plan view. In addition, for the sake of convenience, a −Z-direction may also be referred to as a lower side or a downward direction, and a +Z-direction may also be referred to an upper side or an upward direction, but such representations do not indicate a universal vertical relationship.

<Configuration of Sensor Module 100>

Figure 4:
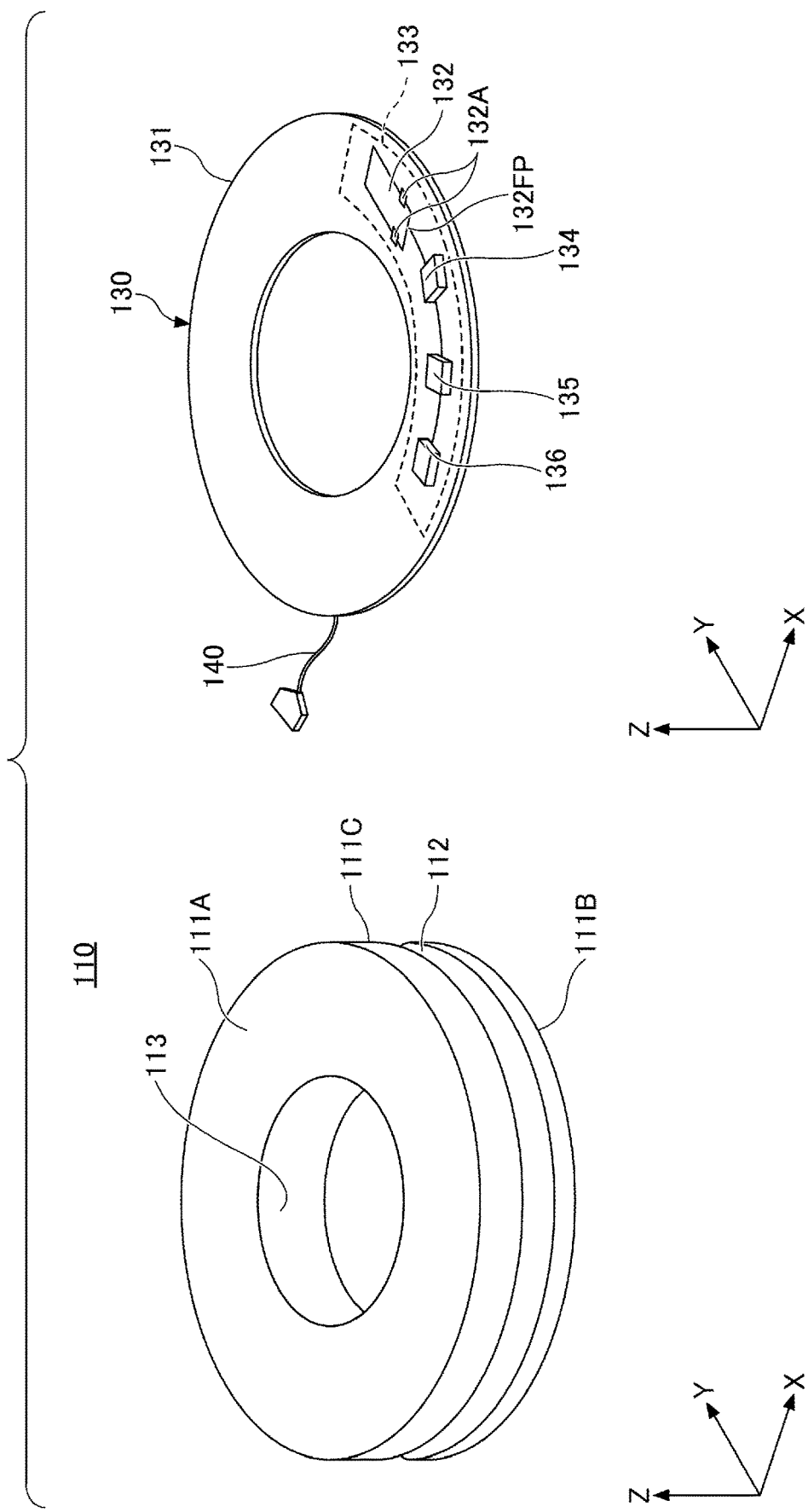
FIG. 4 is a diagram illustrating a metal member 110, a multi-module 130, and a power cable 140.
Figure 5:
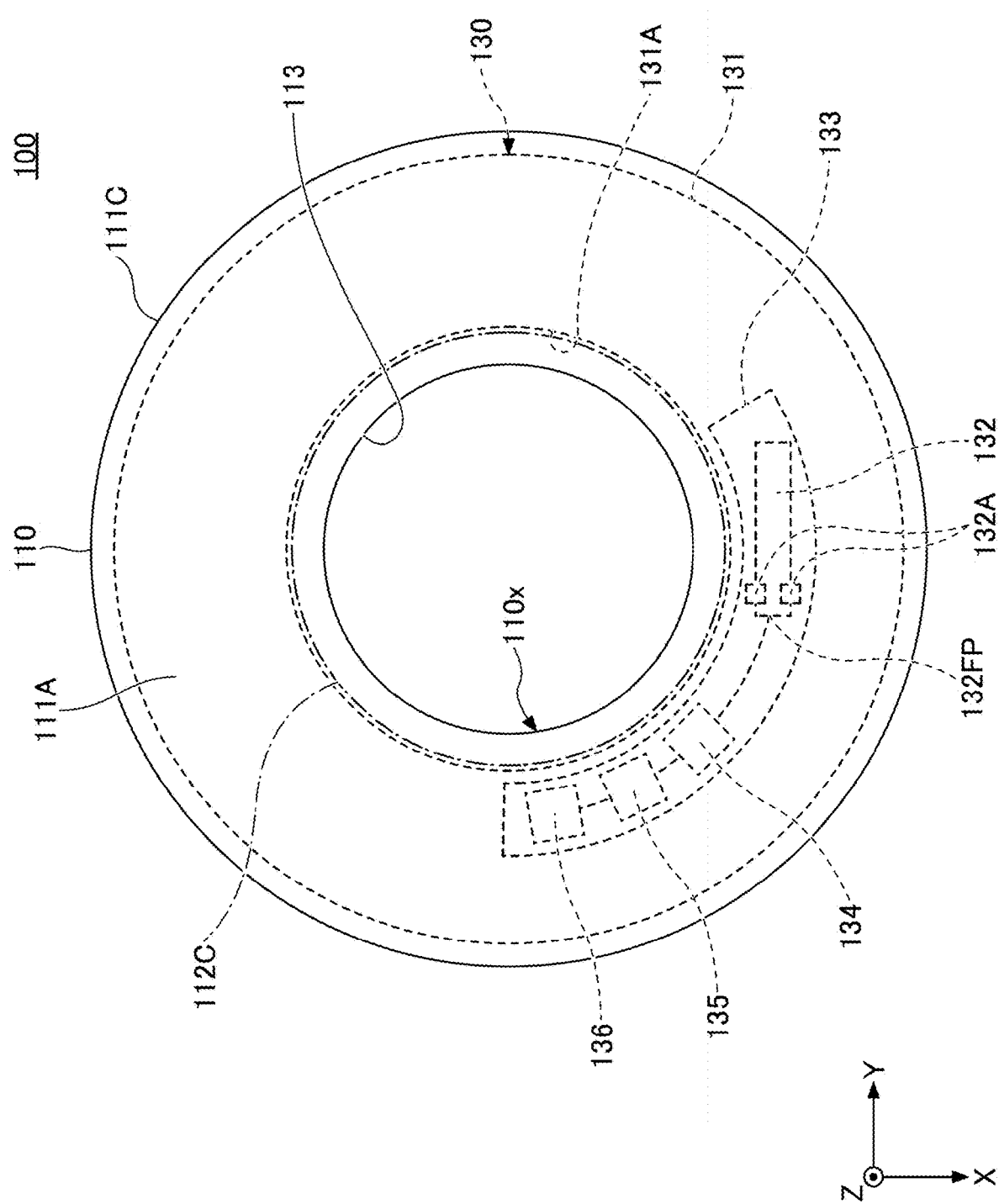
FIG. 5 is a top view illustrating the sensor module 100.

The sensor module 100 includes a metal member 110, a resin part 120, a multi-module 130, and a power cable 140. The sensor module 100 is a disk shaped member. Hereinafter, FIG. 4 and FIG. 5 will be described in addition to FIG. 1 through FIG. 3. FIG. 4 is a diagram illustrating the metal member 110, the multi-module 130, and the power cable 140. FIG. 5 is a top view illustrating the sensor module 100. FIG. 5 illustrates an arrangement of the multi-module 130 in the sensor module 100.

The metal member 110 is formed of a disk shaped metal member, for example. The metal member 110 has an upper surface 111A, a lower surface 111B, a side surface 111C, a slit 111D, a recess 112, and a through hole 113 penetrating the disk shaped metal member. The upper surface 111A, the lower surface 111B, and the side surface 111C of the metal member 110 correspond to an upper surface, a lower surface, and a side surface of the disk shaped metal member. The side surface 111C extends in a circumferential direction along an outer periphery of metal member 110, and extends in a ring shape throughout the entire circumference of the outer periphery of the metal member 110.

Openings of the through hole 113 are located at center portions of the upper surface 111A and the lower surface 111B, respectively. For this reason, the upper surface 111A and the lower surface 111B have a ring shape in the plan view. The metal member 110 also has a ring shape in the plan view. The metal member 110 is made of a metal, such as stainless steel, iron, aluminum, tungsten, or the like, for example.

The slit 111D extends throughout the entire circumference of the outer periphery of the metal member 110, along the side surface 111C between upper and lower ends of the side surface 111C. The upper end of the side surface 111C corresponds to a boundary between the side surface 111C and the upper surface 111A, and the lower end of the side surface 111C corresponds to a boundary between the side surface 111C and the lower surface 111B.

The slit 111D is defined by upper and lower inner walls 112A and 112B of the recess 112, famed by the metal member 110, in addition to a boundary between the side surface 111C and the recess 112. The inner walls 112A and 112B of the recess 112 are ring shaped inner walls of recess 112 parallel to the XY-plane. The inner walls 112A and 112B oppose each other through an internal space of the recess 112, and form an opening of the recess 112 corresponding to the slit 111D.

Radio waves emitted from an antenna element 132 of the multi-module 130 propagate through the slit 111D, thereby generating a resonance of the propagated radio waves. The radio waves generating the resonance in the slit 111D are emitted to the outside of the metal member 110. Hence, the metal member 110 functions as a passive element. The passive element is synonymous with a parasitic element.

The recess 112 is recessed inward from the side surface 111C in a radial direction of the metal member 110, between the upper and lower ends of the side surface 111C, and has a ring shape. The recess 112 has the inner walls 112A and 112B, and a bottom part 112C that is formed by the metal member 110 and is located at a bottom of the recess 112 when viewed in the radial direction from the side surface 111C. The ring shaped inner walls 112A and 112B are parallel to the XY-plane, and communicate with the bottom part 112C. The bottom part 112C is a cylindrical wall located at a position on an innermost side of the recess 112, and connects the inner walls 112A and 112B.

The bottom part 112C is the cylindrical wall located on an outer side of the through hole 113, and surrounds the outer side of through hole 113 along the radial direction of the through hole 113. A depth of the recess 112 in the radial direction, from the side surface 111C to a surface 112Cx of the bottom part 112C, is constant throughout the entire circumference of the outer periphery of the metal member 110. The resin part 120 and the multi-module 130 are accommodated inside the recess 112. The bottom part 112C defines the recess 112 together with the upper and lower inner walls 112A and 112B of the metal member 110.

The through hole 113 is provided at the center portion of the metal member 110 in the plan view, and penetrates the metal member 110 so as to connect the upper surface 111A and the lower surface 111B. The through hole 113, defined by an inner peripheral wall 110x of the metal member 110, is located at a position on the inner side of the recess 112 in the plan view.

The resin part 120 is provided to fill an inside of the recess 112 of the metal member 110, so as to cover the multi-module 130. The resin part 120 covers an upper surface portion of the multi-module 130, and may also cover a lower surface portion of the multi-module 130 in addition to covering the upper surface portion of the multi-module 130. A resin that can be filled into the recess 112, such as an epoxy resin, an acrylic resin, or the like, for example, may be used for the resin part 120. The resin part 120 is used as an encapsulating resin (or sealing resin).

The multi-module 130 is a module having multiple functions, and including a wiring board 131, an antenna element 132, a matching circuit 132A, a ground layer 133, a radio communication device 134, a controller 135, and a sensor 136, for example. Such a multi-module is an example of an electronic device having electronic components, such as the matching circuit 132A, the radio communication device 134, the controller 135, and the sensor 136, mounted on the wiring board 131. The power cable 140 is connected to the multi-module 130 so that the multi-module 130 can receive a supply of power from the outside.

The upper surface of the multi-module 130 is covered with the resin part 120. The resin part 120 insulates the antenna element 132 from the inner wall 112A and protects the matching circuit 132A, the ground layer 133, the radio communication device 134, the controller 135, and the sensor 136. In addition, the resin part 120 may also be provided between the lower surface of the multi-module 130 and the inner wall 112B, so as to also cover the lower surface of the multi-module 130 with the resin part 120.

The wiring board 131 is a wiring board in conformance with the Flame Retardant type 4 (FR-4) standard, for example. The wiring board 131 has a ring shape in the plan view so as to avoid overlapping the through hole 113. The wiring board 131 has an opening 131A located at a center portion thereof in the plan view. A diameter of the opening 131A is slightly greater than a diameter of the bottom part 112C located at the position on the innermost side of the recess 112 of the metal member 110. The opening 131A is used to position the wiring board 131 with respect to the bottom part 112C. The wiring board 131 may be a flexible board made of a polyimide film or the like, for example. The wiring board 131 is arranged parallel to the XY-plane.

The antenna element 132, the matching circuit 132A, the radio communication device 134, the controller 135, and the sensor 136 are mounted on the upper surface of the wiring board 131, and the ground layer 133 is provided in a portion on the lower surface of the wiring board 131. The ground layer 133 is provided in the portion on the lower surface of the wiring board 131 overlapping the antenna element 132, the matching circuit 132A, the radio communication device 134, the controller 135, and the sensor 136 in the plan view.

The antenna element 132 is an example of a radiating part, and is formed by a metal layer provided on the upper surface of the wiring board 131. The antenna element 132 is provided at a position near the inner walls 112A and 112B defining the slit 111D. The position near the inner walls 112A and 112B defining the slit 111D refers a position where the antenna element 132 is near the slit 111D to such an extent that an electromagnetic coupling occurs between the antenna element 132 and the slit 111D. Because the antenna element 132 is covered with the resin part 120, the antenna element 132 is separated from the metal member 110 and insulated from the metal member 110.

The antenna element 132 has a linear pattern, and extends along the direction in which the ring shaped recess 112 extends. Extending along the direction in which the ring shaped recess 112 extends, refers to extending along the circumferential direction of the recess 112, such that a longitudinal direction of the antenna element 132 having the linear pattern extends along the circumferential direction. The planar shape of the antenna element 132 in the plan view is not limited to a linear shape, and may have various shapes, such as an inverted F-type, an inverted L-type, a circular shape, or the like, for example.

The antenna element 132 can be patterned from a copper film, for example. The antenna element 132 forms a microstrip line together with the ground layer 133. In other words, the antenna element 132 may be a microstrip line type radiating element. The antenna element 132 is electrically connected to the radio communication device 134 through an interconnect of the wiring board 131, and a portion to which the interconnect of the wiring board 131 is connected is a power supply part 132FP.

The antenna element 132 receives power from the radio communication device 134, and emits radio waves inside the recess 112. The interconnect electrically connecting the antenna element 132 and the radio communication device 134 also forms a microstrip line together with the ground layer 133. The matching circuit 132A for performing an impedance matching is connected near the power supply part 132FP of the antenna element 132. The matching circuit 132A is an inductor or a capacitor, for example. It is possible to obtain the effect of shortening the wavelength, by using the matching circuit 132A.

As described above, the ground layer 133 is provided on the lower surface or an inner layer of the wiring board 131 in a portion overlapping the antenna element 132, the matching circuit 132A, the radio communication device 134, the controller 135, and the sensor 136 in the plan view. The ground layer 133 is formed by a metal layer provided on the lower surface or the inner layer of the wiring board 131, and the metal layer is a copper film, for example. The ground layer 133 is electrically connected to the metal member 110.

In a case where the ground layer 133 is provided on the lower surface of the wiring board 131, the ground layer 133 may be in direct contact with the inner wall 112B of the recess 112. In this case, the resin part 120 does not necessarily need to be present between the multi-module 130 and the inner wall 112B. In addition, in the case where the ground layer 133 is provided on the lower surface of the wiring board 131, the ground layer 133 and the inner wall 112B of the recess 112 may be electrically connected through a conductive adhesive, an interconnect, or the like. In this case, the resin part 120 may or may not be present between the multi-module 130 and the inner wall 112B. Further, the ground layer 133 may be provided on the inner layer of the wiring board 131. In this case, the ground layer 133 and the metal member 110 may be electrically connected through an interconnect, a pad, or the like. In this case, the resin part 120 may or may not be present between the multi-module 130 and the inner wall 112B.

The radio communication device 134 is an integrated circuit (IC) for radio communication and having a communication function for enabling the sensor module 100 to communicate with an external device. The radio communication device 134 is electrically connected to the antenna element 132, the ground layer 133, and the controller 135 through the interconnects of the wiring board 131. The radio communication device 134, the antenna element 132, and the controller 135 may be electrically connected through interconnects provided on the upper surface of the wiring board 131, for example. The radio communication device 134 and the ground layer 133 may be electrically connected through a via or the like penetrating the wiring board 131 in a thickness direction (Z-direction). Moreover, the radio communication device 134 is electrically connected to the power cable 140 through the interconnect of the wiring board 131, and receives power from outside the sensor module 100 through the power cable 140.

The radio communication device 134 can communicate according to a communication protocol of Bluetooth Low Energy (BLE), registered trademark), for example, but may be configured to communicate according to a communication protocol such as Long Term Evolution (LTE) or the like. The radio communication device 134 outputs a transmission signal including the detection data of the sensor 136 input from the controller 135, to the antenna element 132. The transmission signal output from the radio communication device 134 is emitted from the antenna element 132 to the slit 111D, and emitted from the slit 111D to the outside of the sensor module 100.

The controller 135 performs a control of the entire sensor module 100. The controller 135 is a microcomputer, for example, including a Central Processing Unit (CPU), a Random Access Memory (RAM), a Read Only Memory (ROM), an internal bus, or the like.

The controller 135 is electrically connected to the radio communication device 134 and the sensor 136 through the interconnects of the wiring board 131. The controller 135 acquires the detection data from the sensor 136, and controls the radio communication device 134 to output the transmission signal including the detection data to the antenna element 132, thereby causing the antenna element 132 to emit the transmission signal. In addition, the controller 135 is electrically connected to the power cable 140 through the interconnect of the wiring board 131, and receives the power from outside the sensor module 100 through the power cable 140.

The sensor 136 is a strain sensor (strain gauge), an accelerometer, a thermometer, or the like, for example, and detects a distortion, an acceleration, a temperature, or the like of the metal member 110. The sensor 136 is electrically connected to the controller 135 through the interconnect of the wiring board 131, and outputs the detection data to the controller 135. Moreover, the sensor 136 is electrically connected to the power cable 140 through the interconnect of the wiring board 131, and receives the power from outside the sensor module 100 through the power cable 140.

In the sensor module 100 having the configuration described above, the antenna element 132 is provided near the inner walls 112A and 112B defining the slit 111D, thereby enabling the electromagnetic coupling to be obtained between the antenna element 132 and the slit 111D. Hence, the metal member 110 having the slit 111D can function as a passive element.

When the antenna element 132 of the multi-module 130 receives the powered from the radio communication device 134, the radio waves emitted from the antenna element 132 propagate through the slit 111D, thereby causing the resonance in the slit 111D, and causing the radio waves to be emitted outside the sensor module 100. Accordingly, the metal member 110 functions as the passive element. The transmission signal output from the radio communication device 134 is emitted from the slit 111D of the metal member 110 to the outside of the sensor module 100.

Because the transmission signal includes the detection data of the sensor 136, the detection data representing information such as the distortion, the acceleration, the temperature, or the like detected by the sensor 136 can be acquired when an external device outside the sensor module 100 receives the radio waves emitted from the sensor module 100.

For example, a circumferential length of the slit 111D, at the boundary between the side surface 111C and the recess 112, may be set to an electrical length of one wavelength at the frequency (communication frequency) of the radio waves emitted from the radio communication device 134 of the multi-module 130. That is, at a portion of the slit 111D located at a position on an outermost side along the radial direction, the circumferential length of the slit 111D may be set to the electrical length of one wavelength at the communication frequency of the multi-module 130.

In addition, with regard to the circumferential length of the slit 111D, a circumferential length of the surface 112Cx of the bottom part 112C located at the position on the innermost side along the radial direction, may be set to the electrical length of one wavelength at the communication frequency of the multi-module 130, for example. Moreover, with regard to the circumferential length of the slit 111D, a circumferential length of the slit 111D at any position along the radial direction, between the position on the outermost side (boundary between the side surface 111C and the recess 112) of the slit 111D along the radial direction and the surface 112Cx of the bottom part 112C located at the position on the innermost side along the radial direction, may be set to the electrical length of one wavelength at the communication frequency of the multi-module 130, for example.

Further, the circumferential length of the slit 111D described above does not need to be strictly set to the electrical length of one wavelength at the communication frequency of multi-module 130. The resin part 120 and the multi-module 130 are disposed inside the recess 112 of the metal member 110. If impedance characteristics of the metal member 110 vary due to the resin part 120 and the multi-module 130 disposed inside the recess 112, the circumferential length of the slit 111D may be adjusted to be shorter or longer than the electrical length of one wavelength at the communication frequency of the multi-module 130, so that the impedance of the slit 111D is matched to the impedance of the metal member 110. The impedance of the slit 111D may be matched to the impedance of the metal member 110 by adjusting an electrostatic capacitance of a capacitor of the matching circuit 132A or an inductance of a coil of the matching circuit 132A while adjusting the circumferential length of the slit 111D. Setting the circumferential length of the slit 111D to the electrical length of one wavelength at the frequency (communication frequency) of the radio waves emitted from the radiating part of the multi-module 130, includes adjusting the length of the slit 111D in the above described manner.

For example, the electrical length of one wavelength at the communication frequency of the radio waves communicated from the radio communication device 134 may be longer than or equal to the circumferential length of the slit 111D at the surface of the bottom part 112C of the recess 112, and shorter than or equal to the circumferential length of the slit 111D at the boundary between the side surface 111C and the recess 112.

<Configuration of Sensor Module 100>

Figure 6:
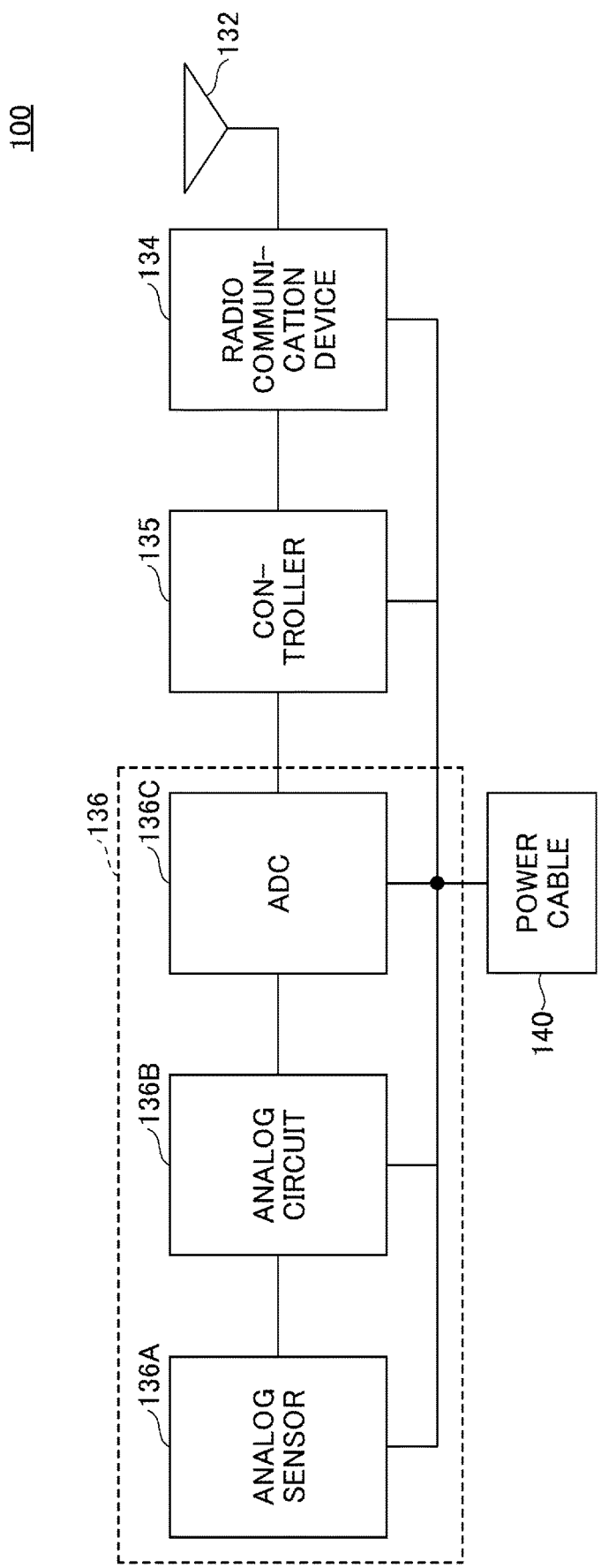
FIG. 6 is a block diagram illustrating a configuration of the sensor module 100.

FIG. 6 is a block diagram illustrating a configuration of the sensor module 100. FIG. 6 illustrates the antenna element 132, the radio communication device 134, the controller 135, and the sensor 136 of the multi-module 130 of the sensor module 100, and the power cable 140.

The sensor 136 includes an analog sensor 136A, an analog circuit 136B, and an analog-to-digital converter (ADC) 136C. An analog data detected by the analog sensor 136A is subjected to a signal processing, such as noise reduction or the like, in the analog circuit 136B, before being converted into a digital data in the ADC 136C. The digital data from the ADC 136C is output to the controller 135 as the detection data. The sensor 136 may be a digital sensor, and a battery may be provided in place of the power cable 140, as will be described later in detail with reference to FIG. 11.

<S11 Parameter>

Figure 7:
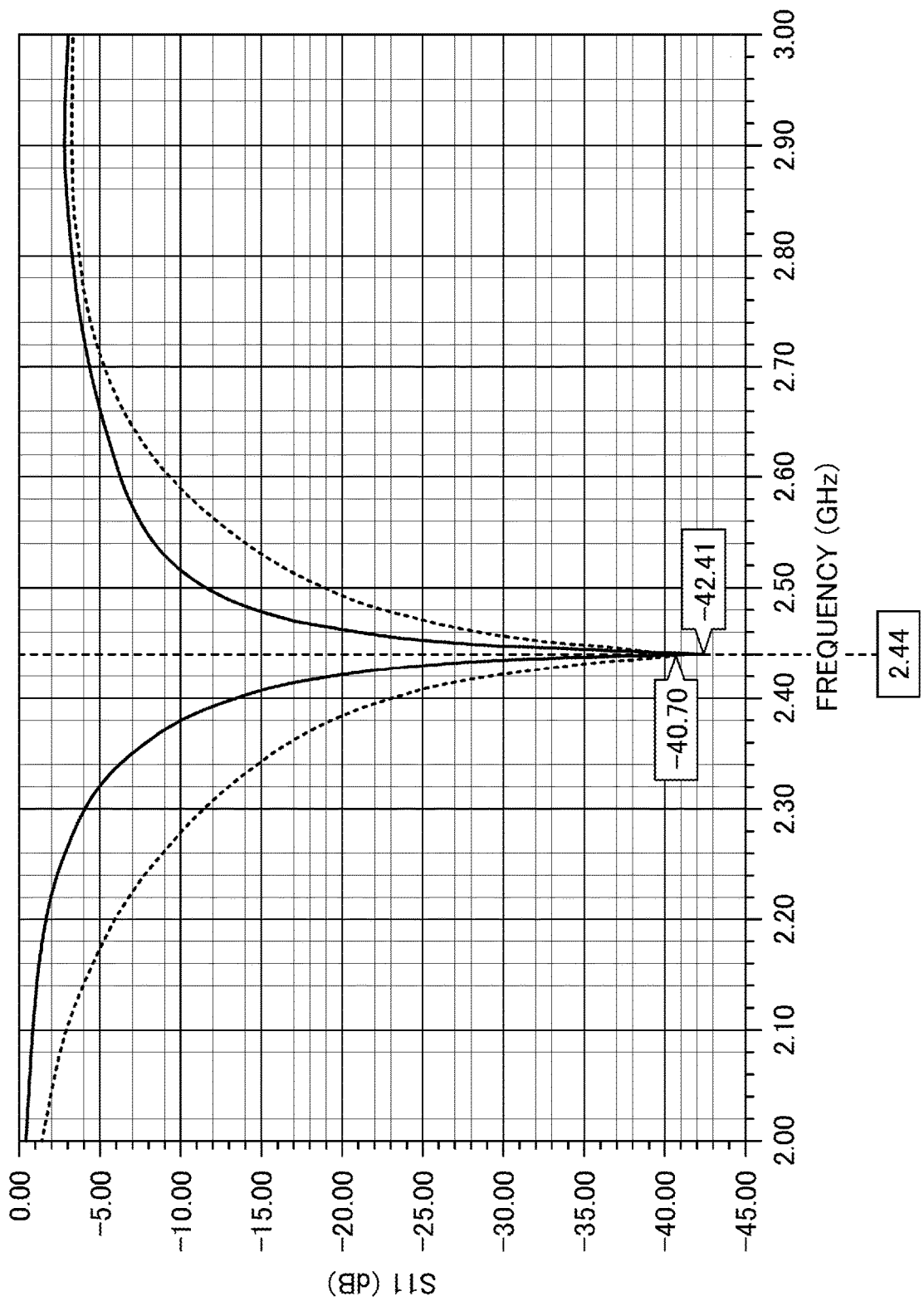
FIG. 7 is a diagram illustrating frequency characteristics of an S11 parameter of the sensor module 100.

FIG. 7 is a diagram illustrating frequency characteristics of an S11 parameter of the sensor module 100. In FIG. 7, the abscissa indicates the frequency (GHz), and the ordinate indicates the S11 parameter (dB). The S11 parameter represents a reflection coefficient of the power reflected from the slit 111D to the antenna element 132, with respect to the power input from the antenna element 132 to the slit 111D.

FIG. 7 illustrates results obtained by electromagnetic field simulation for two simulation models of the sensor module 100, for a case where the communication frequency of the multi-module 130 is set to 2.44 (GHz), for example.

In FIG. 7, a dashed line indicates the S11 parameter obtained for a first simulation model in which a diameter of the metal member 110 is 62 mm, a dielectric constant of the resin part 120 is 1.7, and a gap between the inner walls 112A and 112B defining the slit 111D is 3 mm. On the other hand, a solid line indicates the S11 parameter obtained for a second simulation model in which the diameter of the metal member 110 is 62 mm, the dielectric constant of the resin part 120 is 3.1, and the gap between the inner walls 112A and 112B defining the slit 111D is 2 mm. A resonant frequency of the slit 111D was set to 2.44 GHz.

A minimum value of the S11 parameter for the first simulation model indicated by the dashed line, and a minimum value of the S11 parameter for the second simulation model indicated by the solid line were obtained at 2.44 GHz, and were −40.70 dB and −42.41 dB, respectively. For both the first simulation model and the second simulation model, the resonance was generated at 2.44 (GHz), and a broadband was obtained near 2.44 GHz with an extremely low reflection of −10 dB or less, as indicated by the dashed line and the solid line, respectively. A broader band was obtained for the first simulation model as indicated by the dashed line, when compared to the second simulation model as indicated by the solid line.

<Simulation Results of Directivity>

Figure 8:
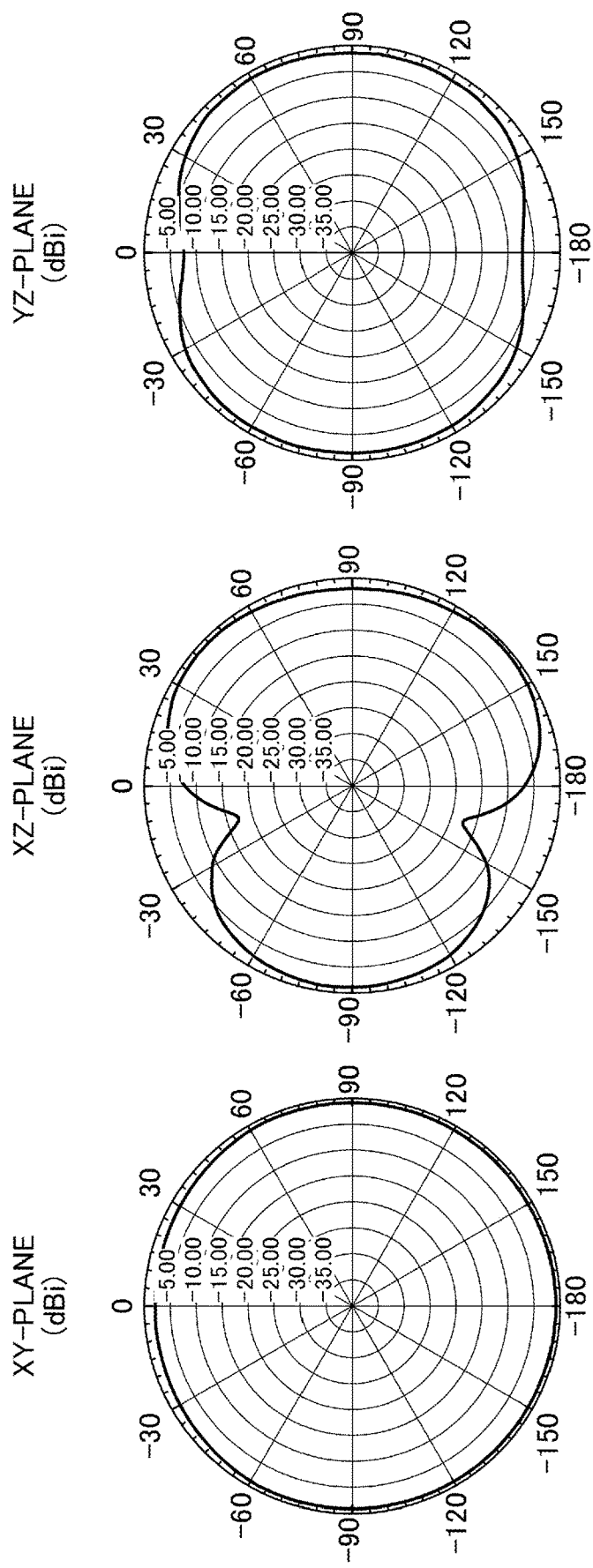
FIG. 8 is a diagram illustrating simulation results of directivity of the sensor module 100.

FIG. 8 is a diagram illustrating simulation results of directivity of the sensor module 100. FIG. 8 illustrates directivities at the XY-plane, the XZ-plane, and the YZ-plane when the communication frequency of the multi-module 130 is set to 2.44 (GHz), for example. On the XY-plane, a 0-degree direction is the +X-direction, and a −90-degree direction is the +Y-direction. On the XZ-plane, the 0-degree direction is the +Z-direction, and the 90-degree direction is the +X-direction. On the YZ-plane, the 0-degree direction is the +Z-direction, and the 90-degree direction is the +Y-direction.

On the XY-plane, the directionality was approximately uniform. On the XZ-plane, the directionality was such that the radiation is stronger on the +X-direction side where the antenna element 132 is positioned compared to the −X-direction side. On the YZ-plane, the directivity was such that the radiation in the horizontal direction is stronger than in the vertical direction.

As described above, the sensor module 100 includes the multi-module 130 disposed in the resin part 120 inside the recess 112 of the metal member 110, so that the metal member 110 having the slit 111D can function as the passive element.

Accordingly, it is possible to provide the sensor module 100 having the metal member 110 which can be utilized as the radiating element. In addition, the low reflection can be obtained as illustrated in FIG. 7, and the uniform directivity can be obtained as illustrated in FIG. 8. For this reason, it is possible to provide the sensor module 100 having an excellent radiative characteristic.

Because the recess 112 forms the ring shaped slit 111D, it is possible to obtain the uniform directivity in the plan view. Moreover, by providing the recess 112 in the side surface 111C of the metal member 110, it is possible to easily form the slit 111D.

The metal member 110 has the through hole 113 penetrating the center thereof in the plan view. The metal member 110 having the through hole 113 at the center thereof may be utilized as a bearing holder, for example. The bearing holder is a fixture for holding the bearing. By utilizing the metal member 110 as the bearing holder, it becomes possible to transmit the detection data representing the distortion, the acceleration, the temperature, or the like of the bearing to the external device outside the sensor module 100.

Because the antenna element 132 extends along the direction in which ring shaped recess 112 extends, the radio waves can efficiently propagate through the slit 111D famed by the recess 112, thereby making it possible to utilize the metal member 110 as the radiating element, and provide the sensor module 100 having an even more excellent radiating characteristic.

In addition, because the antenna element 132 is disposed near the inner walls 112A and 112B defining the slit 111D, the electromagnetic coupling occurs between the antenna element 132 and the slit 111D, and the resonance is likely to occur in the slit 111D. Hence, it possible to utilize the metal member 110 as the radiating element, and provide the sensor module 100 having an even more excellent radiating characteristic.

Moreover, because the antenna element 132, the matching circuit 132A, the ground layer 133, the radio communication device 134, the controller 135, and the sensor 136 are mounted on the wiring board 131, it is possible to easily manufacture the sensor module 100.

Further, because the multi-module 130 having the wiring board 131, the antenna element 132, the matching circuit 132A, the ground layer 133, the radio communication device 134, the controller 135, and the sensor 136 is disposed inside the resin part 120, it is possible to easily manufacture the sensor module 100.

<First Modification>

Figure 9:
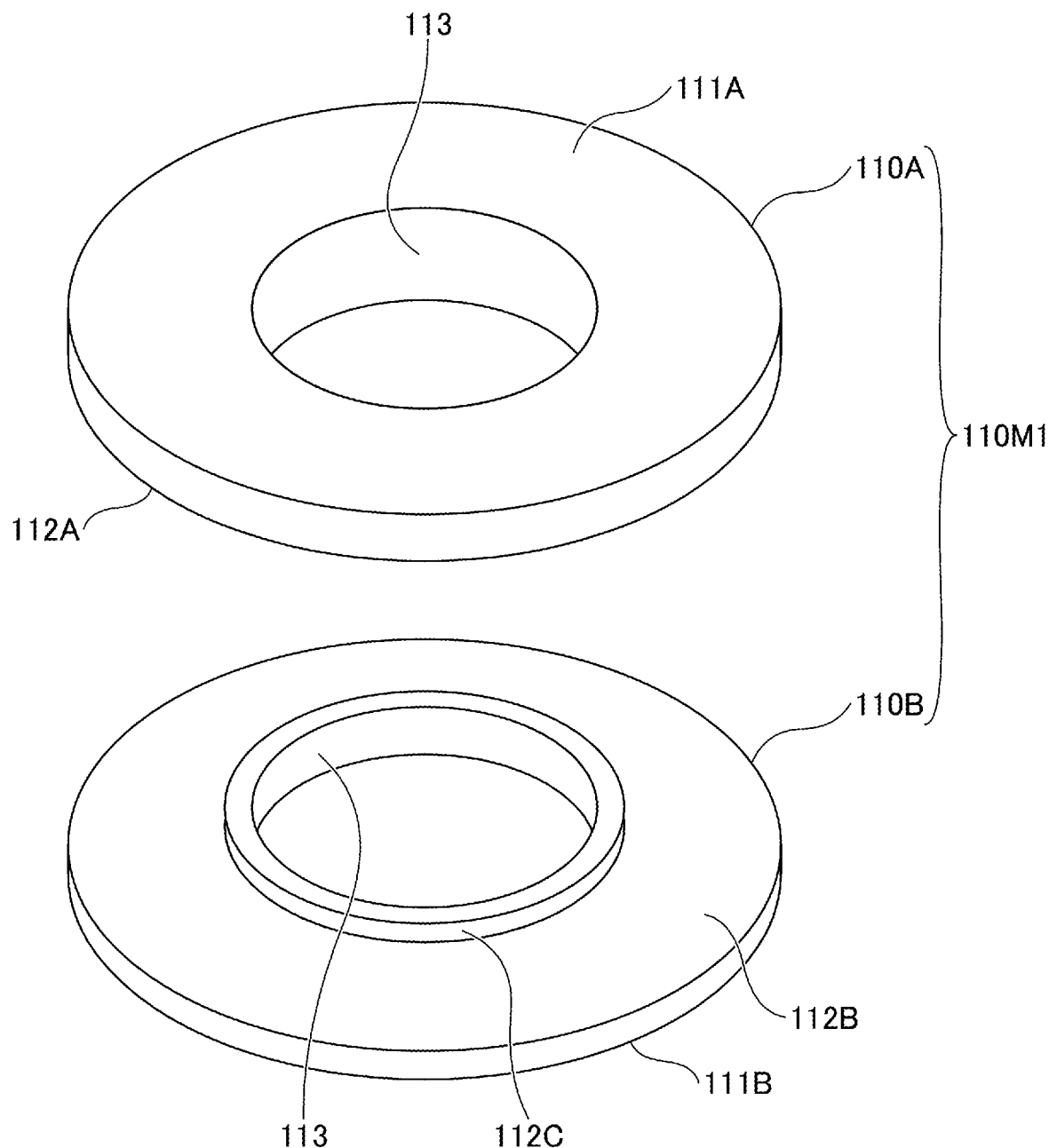
FIG. 9 is a diagram illustrating a metal member 110M1 according to a first modification of the embodiment.

FIG. 9 is a diagram illustrating a metal member 110M1 according to a first modification of the embodiment. The metal member 110M1 is divided into an upper metal member 110A, and a lower metal member 110B. The metal member 110A corresponds to a portion of the metal member 110 above the inner wall 112A of the metal member 110 illustrated in FIG. 1 through FIG. 5. The metal member 110B corresponds to a portion of the metal member 110 below the inner wall 112A of the metal member 110 illustrated in FIG. 1 through FIG. 5. For this reason, the bottom part 112C is provided at a center portion of an upper surface of the metal member 110B.

The metal member 110A is an example of a first metal member provided on the upper side (first side), and the metal member 110B is an example of a second metal member provided on the lower side (second side) and fixed to the metal member 110A. The recess 112 is provided at a portion where the metal member 110A with the metal member 110B are joined. When such metal members 110A and 110B are bonded together, it is possible to obtain a member having the same configuration as the metal member 110 illustrated in FIG. 1 through FIG. 5.

<Second Modification>

Figure 10:
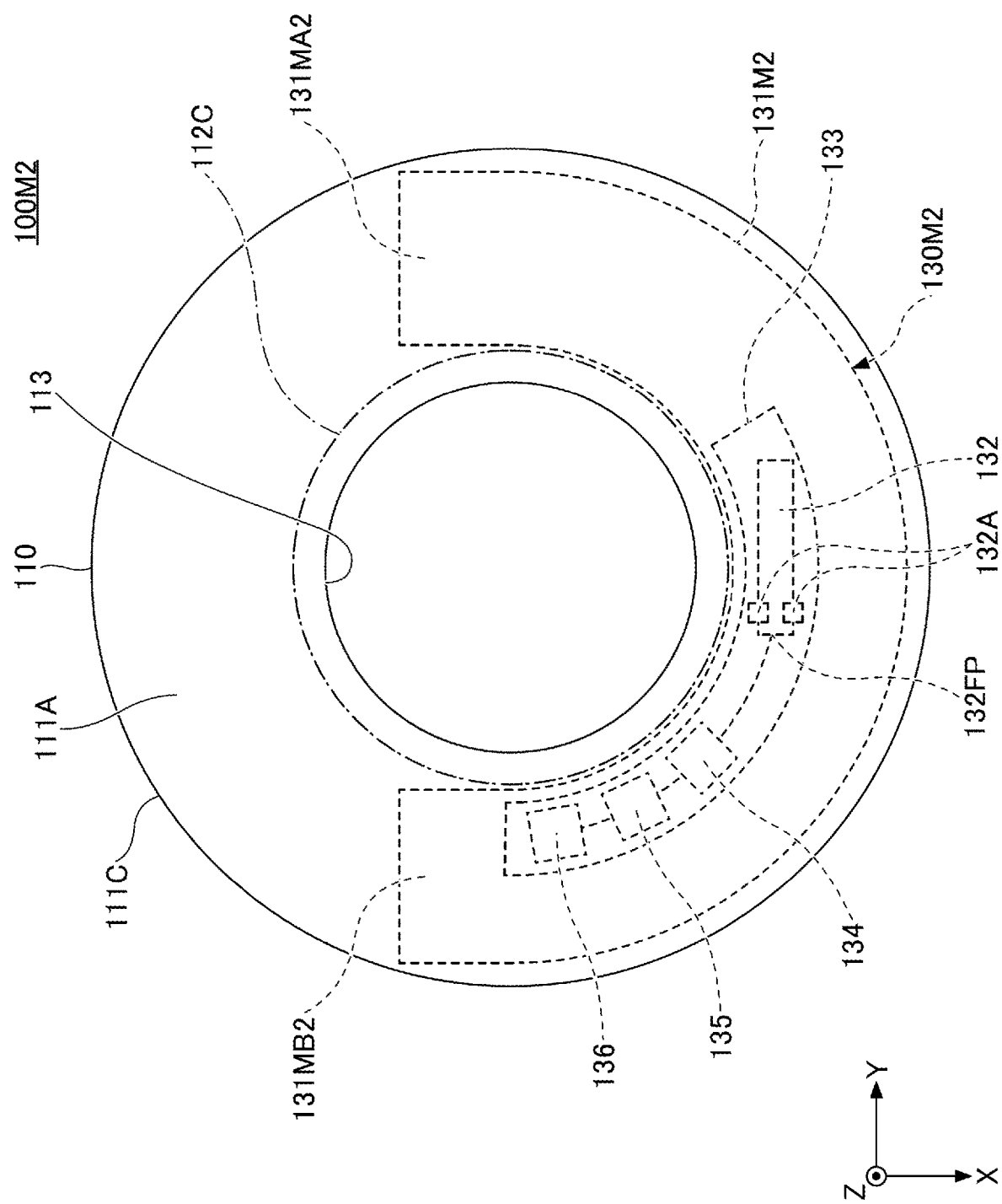
FIG. 10 is a diagram illustrating a sensor module 100M2 according to a second modification of the embodiment.

FIG. 10 is a diagram illustrating a sensor module 100M2 according to a second modification of the embodiment. The sensor module 100M2 has a configuration in which the multi-module 130 of the sensor module 100 illustrated in FIG. 1 through FIG. 5 is replaced by a multi-module 130M2.

The multi-module 130M2 has a U-shape in the plan view. A wiring board 131M2 of the multi-module 130M2 has a U-shape in the plan view, and a distance between ends 131MA2 and 131MB2 of the wiring board 131M2 along the Y-direction is greater than the outer diameter of the bottom part 112C of the metal member 110. For this reason, the bottom part 112C of the metal member 110 can be inserted between the ends 131MA2 and 131MB2 of the U-shaped wiring board 131M2, and the multi-module 130M2 can easily be mounted on the metal member 110.

<Third Modification>

Figure 11:
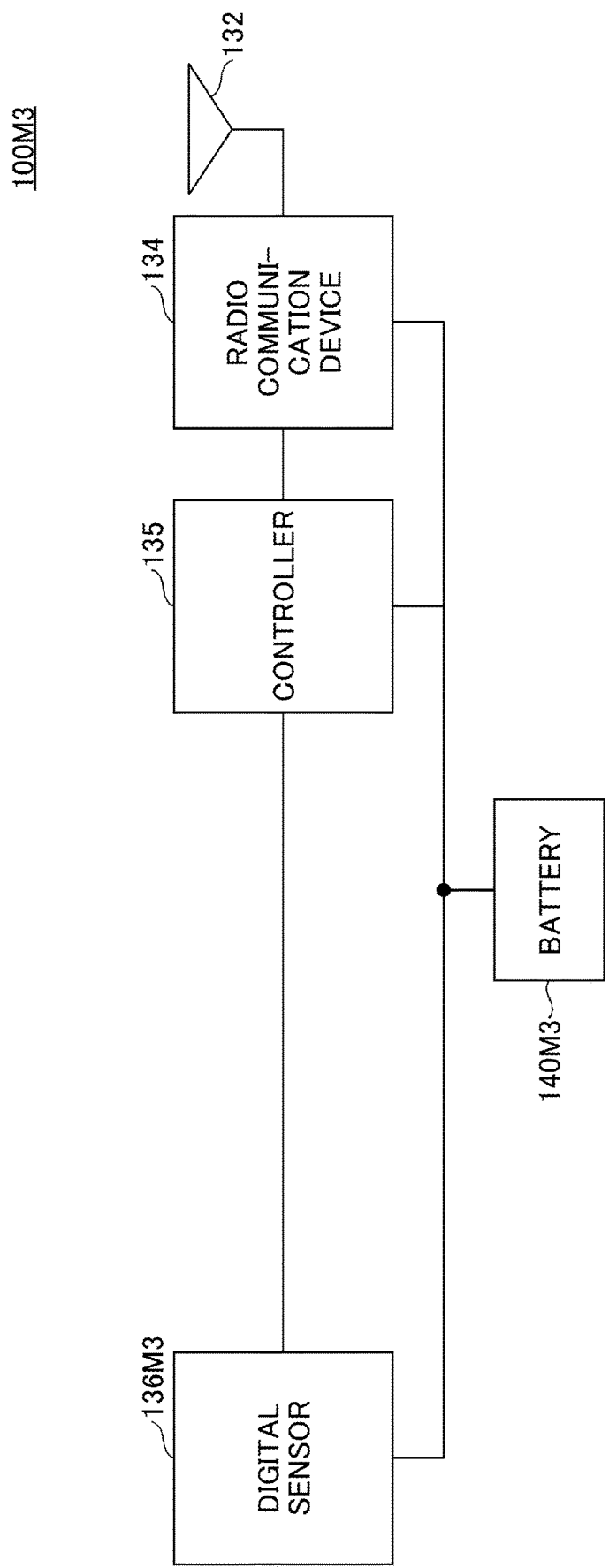
FIG. 11 is a block diagram illustrating a configuration of a sensor module 100M3 according to a third modification of the embodiment.

FIG. 11 is a block diagram illustrating the configuration of a sensor module 100M3 according to a third modification of the embodiment. The sensor module 100M3 differs from the sensor module 100 that is illustrated in FIG. 6 and includes the analog sensor 136A and the power cable 140, in that the sensor module 100M3 includes a digital sensor 136M3 and a battery 140M3. The digital sensor 136M3 outputs the detection data, as digital data, to the controller 135. The battery 140M3 may be mounted on the upper surface of the wiring board 131 and accommodated inside the recess 112 of the metal member 110, for example.

The number of components required in the sensor module 100M3 can be reduced, by including the digital sensor 136M3 in the sensor module 100M3. In addition, because the sensor module 100M3 includes the battery 140M3, the sensor module 100M3 does not include a protruding part, such as the power cable 140, protruding outside the metal member 110, thereby simplifying the external appearance of the sensor module 100M3. Further, because the sensor module 100M3 can be operated by the power supplied from the battery 140M3, it is possible to utilize the sensor module 100M3 at a location where no power supply part for supplying the power is present.

<Fourth and Fifth Modifications>

Figure 12:
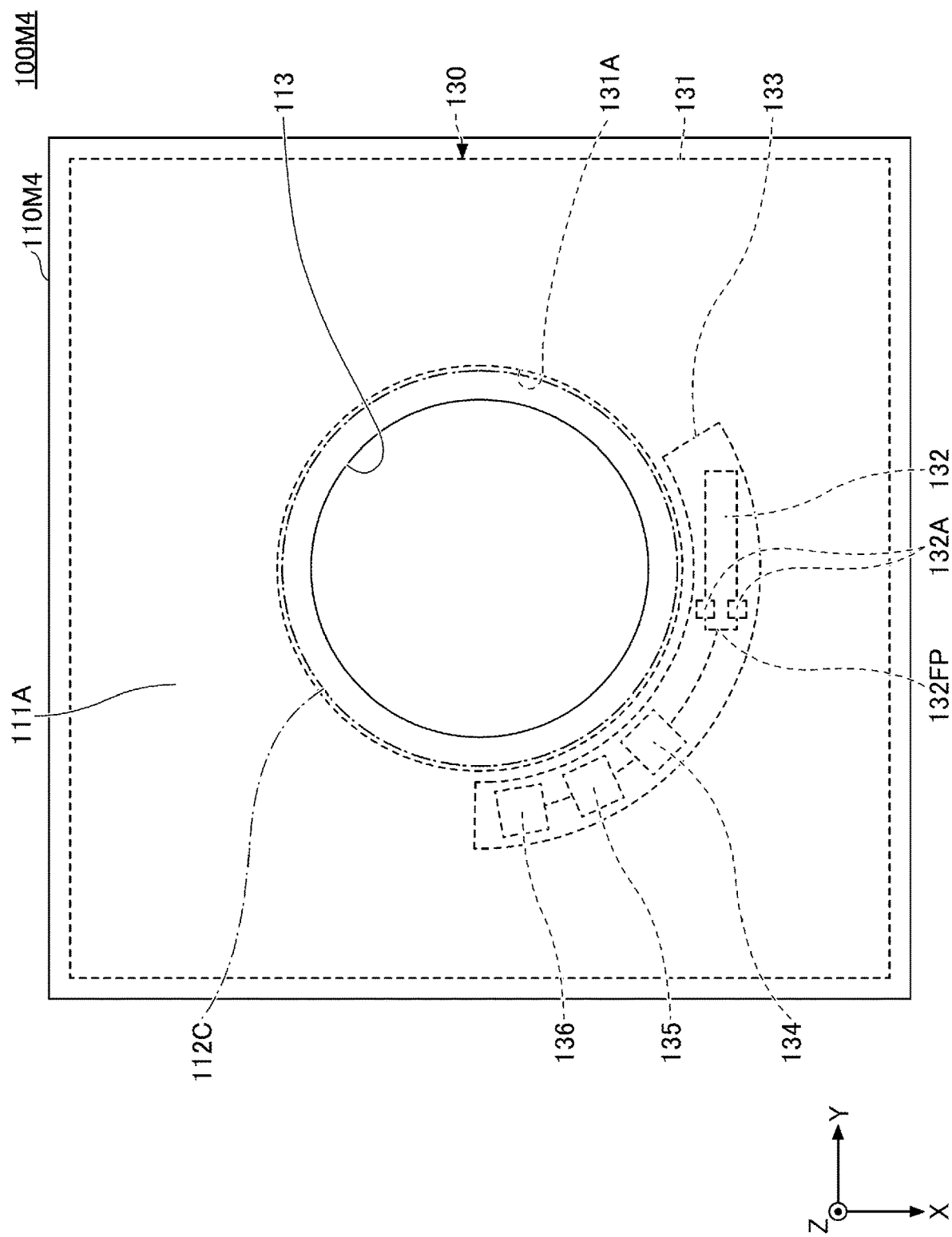
FIG. 12 is a diagram illustrating a sensor module 100M4 according to a fourth modification of the embodiment.
Figure 13:
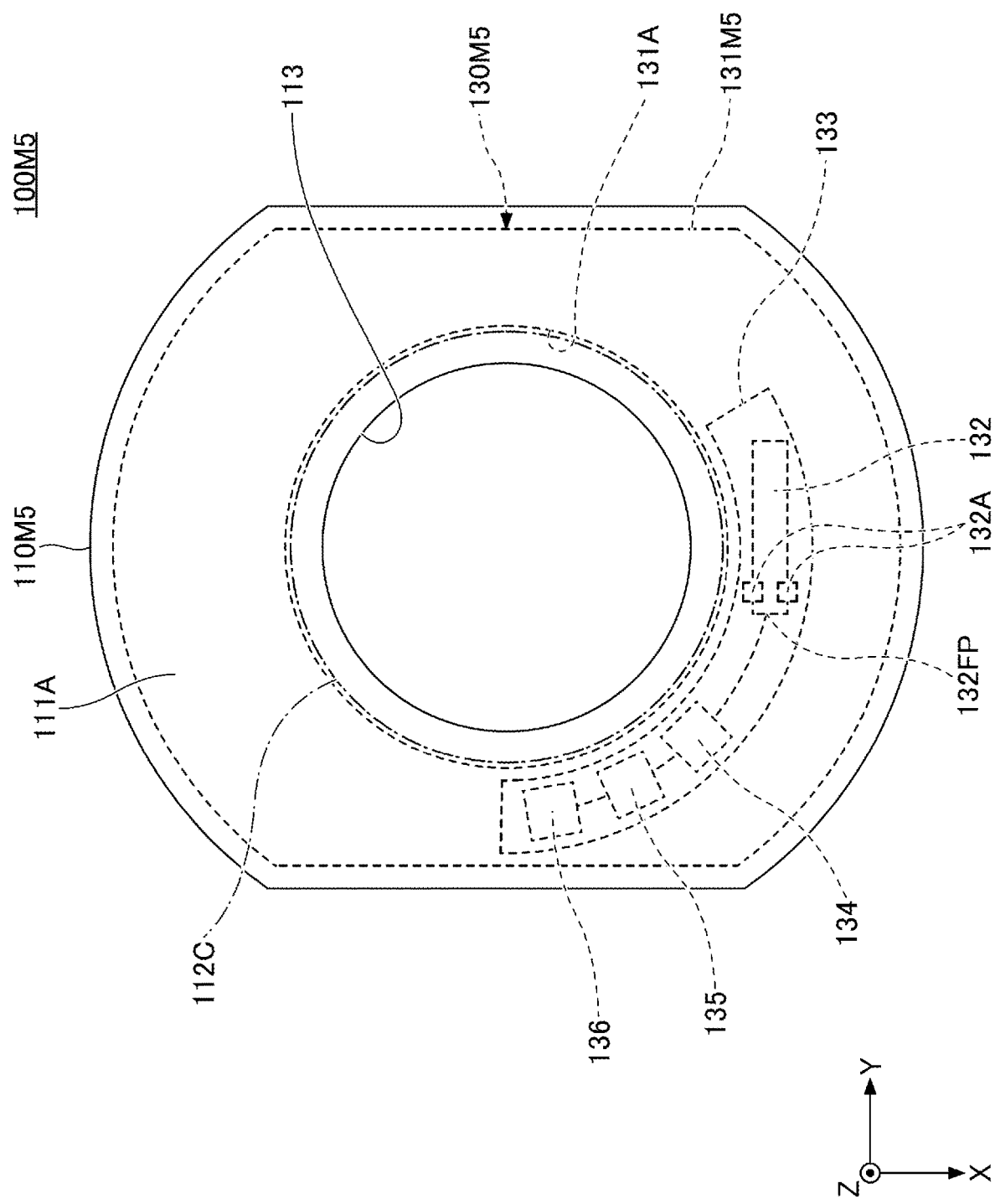
FIG. 13 is a diagram illustrating a sensor module 100M5 according to a fifth modification of the embodiment.

FIG. 12 and FIG. 13 are diagrams illustrating sensor modules 100M4 and 100M5 according to fourth and fifth modifications, respectively.

In the sensor module 100M4 illustrated in FIG. 12, the metal member 110 of the sensor module 100 illustrated in FIG. 5 is replaced by a metal member 110M4. The metal member 110M4 has a rectangular shape in the plan view. The rectangular shape is an example of a polygonal shape. The planar shape of the metal member 110M4 is not limited to the rectangular shape, and may be a triangular shape or a polygonal shape having five or more sides and vertices.

In the sensor module 100M5 illustrated in FIG. 13, an outer shape of a metal member 110M5 in the plan view corresponds to the circular metal member 110 illustrated in FIG. 5 having both ends along the Y-direction cut along the X-direction. The sensor module 100M5 includes a multi-module 130M5 in place of the multi-module 130 illustrated in FIG. 5. A shape of the multi-module 130M5 in the plan view corresponds to the shape of the multi-module 130 having both ends along the Y-direction cut along the X-direction. A wiring board 131M5 of the multi-module 130M5 in the plan view has a shape corresponding to the shape of the wiring board 131 having both ends along the Y-direction cut along the X-direction.

In the sensor module 100M4 illustrated in FIG. 12, a portion of the metal member 110M4 may be truncated (or cut out) in the plan view.

According to the fourth and fifth modifications, the sensor modules 100M4 and 100M5 can be configured to have various shapes.

Accordingly to each of the embodiments and modifications described above, it is possible to provide a sensor module that can utilize a metal member as a radiating element.

Although the modifications of the embodiment are numbered with, for example, "first," "second," "third," "fourth," or "fifth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A sensor module comprising:
a metal member having a side surface extending in a ring shape, and an annular recess recessed from the side surface toward a center portion of the metal member and extending along the side surface;
a resin part filling an inside of the annular recess; and
a multi-module having a wiring board, a radiating part provided on the wiring board and configured to emit radio waves, a radio communication device provided on the wiring board and electrically connected to the radiating part, and a sensor provided on the wiring board and electrically connected to the radio communication device, wherein:
the resin part covers the multi-module and completely fills an inside of the annular recess of the metal member to encapsulate the multi-module, and insulate the metal member from the radiating part,
the metal member has an inner peripheral wall defining a through hole which penetrates the center portion of the metal member, and upper and lower inner walls and a surface of a bottom part defining the annular recess,
the bottom part of the metal member is located at a bottom of the annular recess when viewed in a radial direction from the side surface of the metal member toward the center portion of the metal member,
the upper and lower inner walls of the metal member are parallel to each other, oppose each other, and connect to the surface of the bottom part of the metal member,
the inner peripheral wall is located at a position closer to the center portion of the metal member than the surface of the bottom part is to the center portion of the metal member in the radial direction,
the wiring board has a ring shape with an opening at a center portion thereof in a plan view, and
a diameter of the opening of the wiring board is greater than a diameter of the bottom part of the annular recess of the metal member in the plan view, and a diameter of an outer periphery of the wiring board is smaller than a diameter of an outer periphery of the metal member forming the side surface in the plan view.

2. The sensor module as claimed in claim 1, wherein the annular recess opens at the side surface to form a ring shaped slit defined by the upper and lower inner walls and a boundary between the side surface and the annular recess.

3. The sensor module as claimed in claim 2, wherein the radiating part is disposed at a position near the upper and lower inner walls and near the slit to such an extent that an electromagnetic coupling occurs between the radiating part and the slit.

4. The sensor module as claimed in claim 1, wherein an outer shape of the metal member in a plan view is selected from a group consisting of a circular shape, a polygonal shape, and a circular shape including a truncated portion.

5. The sensor module as claimed in claim 1, wherein:
the metal member includes a first metal member disposed above the annular recess, and a second metal member disposed below the annular recess and fixed to the first metal member, and
the annular recess is provided at a portion where the first metal member and the second metal member are joined.

6. The sensor module as claimed in claim 1, wherein the radiating part extends along a direction in which the annular recess extends.

7. The sensor module as claimed in claim 1, further comprising:
a power cable electrically connected to the sensor.

8. The sensor module as claimed in claim 1, further comprising:
a battery electrically connected to the sensor.

9. The sensor module as claimed in claim 8, wherein the battery is mounted on the wiring board.

10. The sensor module as claimed in claim 1, wherein:
the annular recess opens at the side surface of the metal member to form a ring shaped slit defined by the upper and lower inner walls and a boundary between the side surface and the annular recess of the metal member, and
the radio waves emitted from the radiating part propagate through the slit, thereby generating a resonance of propagated radio waves, so that the radio waves generating the resonance in the slit are emitted outside the metal member.

11. The sensor module as claimed in claim 10, wherein a circumferential length of the slit in the plan view, at a radial position between the side surface and the surface of the bottom part of the metal member along the radial direction, is set to an electrical length of one wavelength at a communication frequency of the radio waves communicated from the radio communication device.

12. The sensor module as claimed in claim 11, wherein the electrical length of one wavelength at the communication frequency of the radio waves communicated from the radio communication device is longer than or equal to a circumferential length of the slit in the plan view, at a radial position of the surface of the bottom part of the metal member along the radial direction, and shorter than or equal to a circumferential length of the slit in the plan view, at a radial position of the boundary between the side surface and the annular recess of the metal member along the radial direction.

13. The sensor module as claimed in claim 1, wherein the radiating part is an antenna element, formed by a metal layer provided on the wiring board, and located at a position near the upper and lower inner walls and near a ring shaped slit defined by the upper and lower inner walls and a boundary between the side surface and the annular recess of the metal member to such an extent that an electromagnetic coupling occurs between the antenna element and the slit.

14. The sensor module as claimed in claim 1, further comprising:
 a battery provided on the wiring board and electrically connected to the sensor; and
 a power cable electrically connected to the sensor, wherein:
 the annular recess opens at the side surface to form a ring shaped slit defined by the upper and lower inner walls and a boundary between the side surface and the annular recess, and
 the radiating part extends along a direction in which the annular recess extends, and is disposed at a position near the upper and lower inner walls and near the slit to such an extent that an electromagnetic coupling occurs between the radiating part and the slit.

15. A sensor module comprising:
 a metal member having a side surface extending in a ring shape, and an annular recess recessed from the side surface toward a center portion of the metal member and extending along the side surface;
 a resin part filling an inside of the annular recess;
 a multi-module having a wiring board, a radiating part provided on the wiring board and configured to emit radio waves, a radio communication device provided on the wiring board and electrically connected to the radiating part, and a sensor provided on the wiring board and electrically connected to the radio communication device; and
 a ground layer provided on a lower surface or an inner layer of the wiring board in a portion overlapping the radiating part, the radio communication device, and the sensor in a plan view, wherein:
 the resin part covers the multi-module and completely fills an inside of the annular recess of the metal member to encapsulate the multi-module, and insulate the metal member from the radiating part,
 the metal member has an inner peripheral wall defining a through hole which penetrates the center portion of the metal member, and upper and lower inner walls and a surface of a bottom part defining the annular recess,
 the bottom part of the metal member is located at a bottom of the annular recess when viewed in a radial direction from the side surface of the metal member toward the center portion of the metal member,
 the upper and lower inner walls of the metal member are parallel to each other, oppose each other, and connect to the surface of the bottom part of the metal member, and
 the inner peripheral wall is located at a position closer to the center portion of the metal member than the surface of the bottom part is to the center portion of the metal member in the radial direction.

* * * * *